Feb. 21, 1961 G. N. KROUSE 2,972,336
REACTION COMPENSATED VIBRATORY PROGRAMMED
FORCE PRODUCING APPARATUS
Filed June 11, 1958
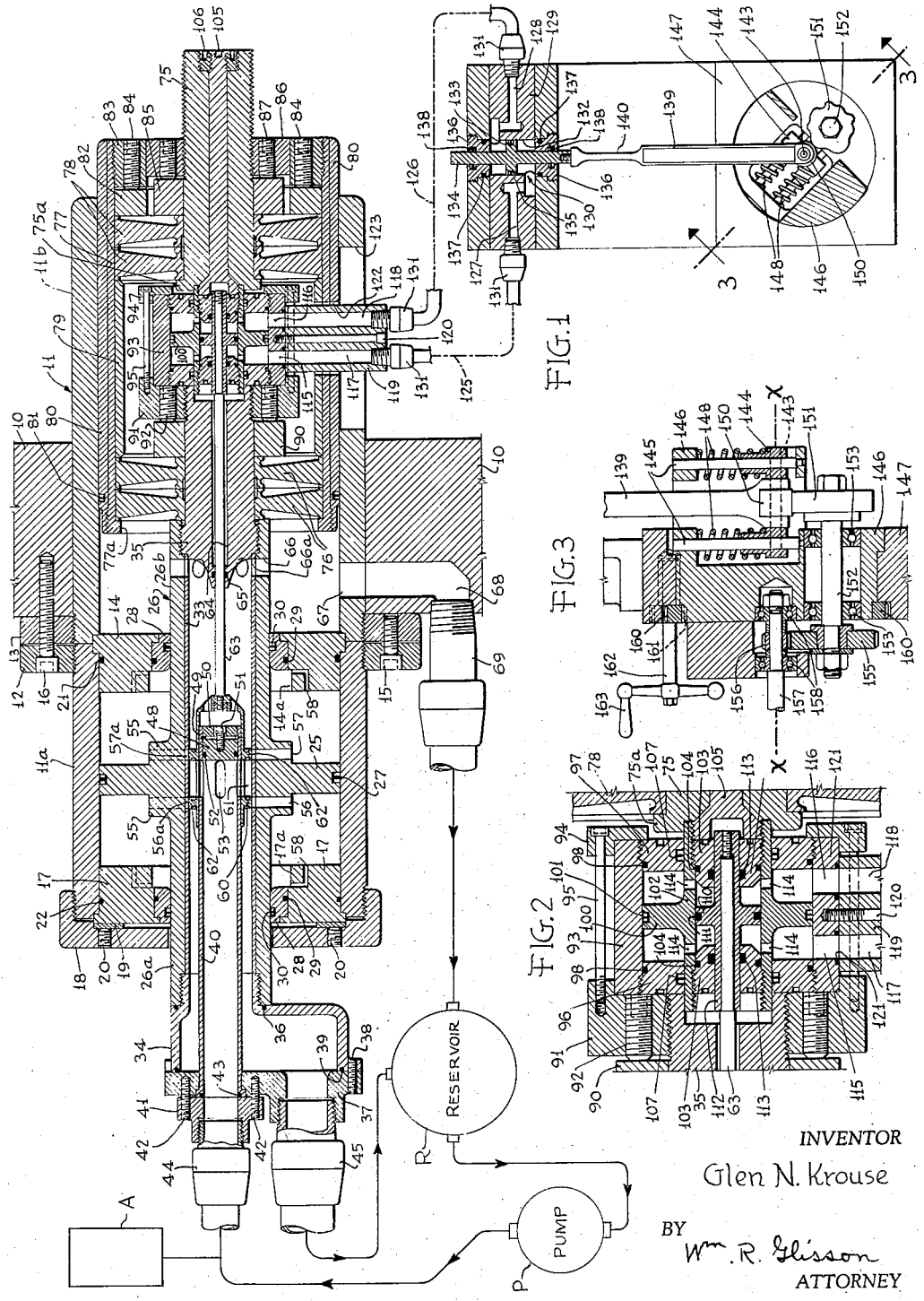
INVENTOR
Glen N. Krouse
BY
Wm. R. Glisson
ATTORNEY

United States Patent Office 2,972,336
Patented Feb. 21, 1961

2,972,336

REACTION COMPENSATED VIBRATORY PROGRAMMED FORCE PRODUCING APPARATUS

Glen N. Krouse, Pottstown, Pa., assignor, by mesne assignments, to The Budd Company, Philadelphia, Pa., a corporation of Pennsylvania Filed June 11, 1958, Ser. No. 741,333

8 Claims. (Cl. 121—38)

This invention relates to reaction compensated vibratory programmed force producing apparatus and has for an object the provision of improvements in this art.

The device disclosed herein provides reciprocatory (broadly vibratory) movement which may be employed for various purposes but which will be discussed herein for the particular purpose of testing materials or structures, referred to as specimens. Its action is programmed in accordance with some predetermined force cycle which it is desired to apply to the specimen to be tested. The imposed cycle input may be referred to as a signal.

The device may act alone on a specimen or may be one of several such devices which act simultaneously and conjointly on a specimen. For example, it may be considered to apply a vertical, lateral, or longitudinal force in cycles to an airplane landing wheel strut while other such devices apply cyclic forces in the other directions. Inasmuch as the forces in other directions have an influence on the force being applied in any given direction it is desirable, in order to achieve realistic test results, to have the test device made subject to changing conditions in the specimen. This may be termed a reaction or feed-back effect.

It is therefore a specific object of the invention to provide a device of the character specified which responds rapidly and precisely to the control program signal and to the specimen reactions; which is relatively simple and durable; and which can readily be adjusted for length and character of action.

In order to convey a more specific understanding of the nature and effects of the invention, an illustrative embodiment thereof will now be described, reference being made to the accompanying drawings, wherein:

Fig. 1 is a vertical longitudinal section of apparatus embodying the invention, some parts being shown diagrammatically;

Fig. 2 is an enlarged view of a portion of the apparatus shown on the right right hand side of Fig. 1; and Fig. 3 is an enlarged section of the signal control or programming portion of the apparatus, the section being taken on the line 3—3 of Fig. 1.

Referring to the drawings, a base or frame 10 firmly supports a cylinder assembly 11 in any convenient manner. As shown, the cylinder assembly is formed in two parts 11a, 11b which are provided with threaded collars or rings 12 and 13 respectively. The portion 11a constitutes the cylinder of a power device or fluid motor having a shouldered head 14 which is secured between the cylinder parts. The collars or rings 12 and 13 are secured tightly together as by cap bolts 15 and one or both of the collars is secured to the base 10, as by cap bolts 16.

Another head 17 is provided for the other end of the power cylinder part 11a, this head being inserted to fit against shoulders and being retained by an end cap 18 which is screwed on the end of the cylinder part. For tight securement, a presser ring 19 is placed against the outer side of the head 17 and is brought up by set screws 20 threaded in the end cap 18. Sealing rings 21 and 22 prevent leakage past the heads 14 and 17 respectively.

A piston 25 operates in the power cylinder part 11a, the piston being rigidly mounted on a double-ended piston rod 26 which extends through both of the heads 14 and 17. A sealing ring 27 is provided on the outer periphery of the piston to form a seal with the cylinder.

At each of the heads 14 and 17 an interior piston rod guide bushing 28 is press-fitted in the head, an exterior sealing ring 29 sealing it to the head and an interior sealing ring 30 sealing it around the piston rod.

The piston rod is hollow or tubular for the passage of fluid, such as a liquid under pressure (preferably oil) forced out by a pump P and returned to a reservoir R. An accumulator or surge tank A is provided in the line from the pump to the cylinder.

An anti-friction liner 33 is snugly fitted within the tubular piston rod 26 and is retained between a header 34 threaded into the head end of the piston rod and a tail rod 35 threaded into the other end of the piston rod. A sealing ring 36 is provided between the head end of the piston rod and the header 34. A cap 37 is secured over the outer end of the header 34, as by screws 38, a sealing ring 39 being interposed between.

An interior fluid supply tube 40 is concentrically mounted within the tubular piston rod 26, here being shown as passing through an opening in the cap 37 and having an annular flange engaging in a recess of the cap. A fitting 41 secures the tube 40 in place, the fitting being clamped to the cap 37 by screws 42. A sealing ring 43 forms a seal for the joint. A nipple 44 of a flexible fluid supply line is threaded into the fitting 41. A nipple 45 of a flexible fluid return line is threaded in the cap 37.

For convenience of manufacture and assembly the piston rod 26 will preferably be made in two parts, a head part 26a and a tail part 26b secured together on the piston 25, but for simplicity of illustration here this detail is omitted.

The fluid supply tube 40 is closed at its outer end by a plug 48 which is held by a ring 49 clamped in place by a head 50 and a cap bolt 51 threaded into the plug. A sealing ring 52 between the tube and plug prevents leakage.

Adjacent its inner end, the supply tube 40 is provided with a plurality of axially elongated fluid supply ports 53.

The piston rod 26 is formed with annular shouldered enlargements 55 on each side of the piston and through the enlargements is provided with annular sets of ports 56, 57 for the supply and exhaust of fluid. The liner 33 is provided with matching ports 56a and 57a.

Means are provided for cushioning the stop of the piston at each end of its stroke—at such times as it is required to make a full-length stroke. As here shown, the heads 14 and 17 are provided with recesses 14a and 17a of a size to receive the enlargements 55 so that when the enlargements enter the recesses they compress fluid ahead of them. A plurality of small ports 58 in the heads around the recesses provide for gradual escape of entrapped fluid to bring the piston to a cushioned stop.

A sleeve valve 60 operates between the fluid supply tube 40 and the liner 33. It is provided with an annular set of axially elongated supply ports 61 which cooperate with the supply ports 53 of the fluid supply tube 40 and controls exhaust at the ends of the enlarged ring portions 62 at the ends of the valve. The valve has connected to it an operating rod 63 which extends through a bore 64 in the tail piece 35 of the piston rod, a sealing ring 65 being provided to prevent fluid leakage. The means for actuating the valve through the rod 63 will be described presently.

The tail portion 26b of the piston rod 26 is provided with an annular series of exhaust ports 66 and the lining sleeve 33 is provided with matching ports 66a. The cylinder part 11b is provided with an outlet port 67 leading through a channel 68 of the frame 10 to a nippled connection 69 of a return line to the reservoir R.

The tail rod 35 is connected through resilient means to a specimen driving rod 75 which is threaded for a push-pull connection to any desired gear for applying vibratory or reciprocatory loads to a test specimen. The connection between the tail rod 35 and the driving rod 75, as here shown, comprises a first set of relatively stiff resilient disks 76, a tubular slide member 77 and a second set of stiff resilient disks 78 which are secured on the driving rod 75. Relatively stiff or heavy disks 76 and 78 are shown here because the driving loads delivered are very great. For lighter work lighter resilient connections will, of course, be used.

A cylindrical spacer sleeve 79 is secured between the outer edges of the resilient disks 76 and 78. An anti-friction liner sleeve 80 is secured on the outer side of the tubular slide member 77, as by being threaded thereon, this liner sleeve being slidable within the cylindrical guide part 11b and being provided with a sealing ring 81 to prevent exhaust fluid from leaking out.

The slide member 77 is provided with an annular interior shoulder 77a for engaging the outer edge of a resilient disk 76. A ring 82 engages the outer edge of a resilient disk 78. Beyond it a retainer ring 83 is screwed into the end of the slide member 77 and an annular set of clamp screws 84 tighten the resilient disk assembly at the outer edges with the spacer sleeve 79 between them within the slide member 77.

The driving rod 75 has an annular external shoulder 75a on its inner end for engaging the inner edge of one of the resilient disks 78 and a ring 85 engages the inner edge of the other resilient disk 78. A retainer ring 86 is threaded on the driving rod 75 and carries an annular set of clamp screws 87 forcing the resilient disk assembly at the inner edge on the driving rod 75.

There is a sliding fit between the inner surface of the ring 83 and the outer surface of the ring 86.

The inner edge of the inner set of resilient disks 76 is secured on the tail rod 35 by the following means. The end of the piston rod part 26b forms an abutment against which the inner edge of the innermost resilient disk 76 engages. A ring 90 engages the inner edge of the outer resilient disk 76. A retainer ring 91 is threaded on the outer end of the tail rod 35 and carries an annular set of clamp screws 92 for forcing the ring 90 and inner edges of the disks 76 against the end of the piston rod part 26a.

A reaction or feed-back fluid cylinder 93 is secured on the outer end of the piston rod tail piece 35, as by a clamp plate 94 which is drawn toward the retainer ring 91 by long bolts 95 to clamp the cylinder 93 thereagainst. Heads 96 and 97 are provided with sealing rings 98 to prevent escape of fluid from the cylinder 93.

A reaction or feed-back piston 100 operates within the cylinder 93 and is provided on its outer periphery with a sealing ring 101. Interiorly the piston 100 is rigidly secured on a sleeve which forms a power fluid cylinder 102 for the operation of the sleeve valve 60 through its rod 63. Heads 103 are screwed into the ends of the valve operating cylinder 102, with sealing rings 104 disposed between the heads and cylinder. At the outer end the cylinder 102 is secured to a headed operating rod 105, as by being threaded thereon, and the rod is, in turn, rigidly secured to the driving rod 75, as by a spanner nut 106 threaded on the rod and into a counterbore in the end of the driving rod. The heads 96 and 97 of the cylinder 93 are provided interiorly with sealing rings 107 to seal against the outer surface of the sleeve cylinder 102.

It will be seen that since the cylinder 93 is carried by the piston rod tail piece 35 directly and since the piston 100 therein is carried by the driving rod 75 and, further, since the driving rod 75 and the tail rod 35 have resilient connecting means, 76, 78, interposed between them, that the cylinder 93 and piston 100 will assume differential positions which depend on the reaction encountered by the driving rod 75 at its connected specimen.

Within the valve operating cylinder 102 there operates a valve actuating piston 110, the piston being sealed with the interior of the cylinder by a sealing ring 111. A double-ended sleeve piston rod 112 secured to the piston 110 passes through both cylinder heads 103, having sealing rings 113 therewith, and is secured to the valve operating rod 63 as by being threaded thereon and abutting against a shoulder formed on the rod.

The sleeve cylinder 102, on each side of its integrally-carried exterior piston 100, is provided with an annular set of fluid ports 114 providing free communication between the interior of the valve cylinder 102 and the interior of the feed-back cylinder 93. On the lower side, the cylinder 93 is provided with fluid ports 115, 116 which are exteriorly connected with ducts 117, 118 formed in a fitting 119 which is tightly clamped to a seat on the outer surface of the cylinder 93, as by long set screws 120, sealing rings 121 being provided therebetween around the port-channel joints. The fitting 119 passes out through suitable matching openings (denoted together as 122) in the spacer 79, the tubular slide 77 and the tubular liner 80. Clearance is provided in the openings for the movement permitted by the resilient inner disks 76. The fitting also passes out through an elongated opening 123 in the tubular guide cylinder part 11b.

Flexible fluid lines 125 and 126 extend from the ducts 117, 118 to the ducts 127, 128 of a casing 129 of an impulse signal or programming pump 130, suitable nipple fittings 131 being provided at the ends of the lines.

Within the cylinder bore 132 of the pump 130 there operates a pump piston 133 having a double-ended piston rod 134. A sealing ring 135 is provided on the piston 133. Heads 136 are screwed into the ends of the cylinder, sealing rings 137 being provided therebetween, and the pump piston ends pass through the heads, sealing rings 138 being provided therebetween.

The piston rod 134 has attached to its lower end a connecting rod 139 which is provided with a slightly flexible portion 140.

Means are provided for operating the pump piston 133 in any predetermined cycle and in any predetermined range of stroke length. These means are shown in the lower right hand portion of Fig. 1 and in Fig. 3.

The lower end of the connecting rod 139 is mounted on a shaft 143 carried by a slide block 144 which is slidable on guide rods 145. The guide rods 145 are mounted in a cylinder block 146 which is turnably mounted within the cylindrical bore of a fixed base block 147. Springs 148 urge the slide block toward the central axis of the turnable cylinder block 146.

The lower end of the connecting rod carries, on its shaft 143, a cam follower roller 150 which engages the periphery of a signal or program cam 151 which is mounted on a rotary shaft 152 mounted in the turnable cylinder block 146. The surface of the cam has a predetermined shape which is designed to reproduce the desired cyclic movements in the test specimen. The specific shape here shown is chosen merely for illustration and need not be considered to truly represent any specific signal cycle.

The shaft 152 turns in anti-friction bearings 153 carried by the cylinder block 146. At its end opposite the cam it is provided with a gear 155 which meshes with and is driven by a gear 156 fast on a drive shaft 157 mounted in anti-friction bearings 158 in the cylinder block 146. The axis of the shaft 157 coincides with the turning axis of the cylinder block 146, this common axis being designated by the line X—X. The axis of the connecting rod shaft 143, in its median position—that is when the pump piston stands midway between the ends of its cylinder—also lies on the axis X—X.

The cylinder block is arranged to be turned and held in various desired positions, the means here shown for turning it comprising a peripheral gear 160 on the end of the cylinder and meshing operating gear 161 which is carried fast on a hand shaft 162 provided with a handle 163. If self-locking in any position is desired worm gears may be used instead of the spur gears here shown.

It will be clear, from consideration of this mechanism, that when the axis of the cam shaft 152 stands directly below the axis X—X of the cylinder block 146, the movement imparted to the connecting rod 139 which operates the pump piston will be the maximum and when the axis of the cam shaft 152 stands at the same level as the axis X—X that the action on the connecting rod will be the minimum. Within the range of 90 degrees between these two extreme positions the amplitude of movement may be adjusted to any amount desired.

The operation of the apparatus is as follows. With a signal cam 151 of a given shape and with a given turned setting of the cylinder block 146 by the handle 163 for a given amplitude of vibration, the impulse pump shaft 152 is set into operation and fluid from the pump is supplied to the cylinder-piston device 11a, 25. Fluid from the signal pump 130 will move the valve control piston 110 axially and this will move the sleeve valve 60 axially to cause the piston 25 to move in the cylinder 11a. The piston acts through its rod 26 and the resilient disk assembly (35, 76, 77, 78) to operate the driving rod 75 and through it to reciprocate the specimen. The resistance of the specimen to this action influences the control of the valve piston 110 by the differential action between the piston 100 and its cylinder 93, the one being responsive to the driving rod 75 and the other to the piston rod 26, 35, with the resilient disks 76, 78 interposed. The movement of the piston 100 in its cylinder 93 will force fluid to one side or the other of piston 110 in its cylinder 102, correspondingly allowing fluid from the other side of piston 110 to flow into the other end of cylinder 93, and thereby will influence the action of piston 110 on the sleeve valve 60 which it operates. This feed-back action from the specimen causes the driving mechanism to take into account the altered resistance of the specimen due to forces acting in other directions. In this way a realistic action upon the specimen in response to the imposed signals is achieved.

The operation may be better understood by following the action in somewhat greater detail. Assume that the pilot pump piston 133 is moved up by a lobe of the pilot pump operating cam 151. This will force fluid through line 126 into the valve operating cylinder 102 to the right of the valve operating piston 110 therein and force the piston 110 and the valve 60 to the left, fluid flowing out of the left end of cylinder 102 back to the lower end of the pilot pump cylinder 130 through line 125 as fluid flows into the right end of cylinder 102. When the valve 60 moves to the left it will admit power pressure fluid from supply tube 40 to the left end of cylinder 11a and move the piston 25 to the right. This, through the flexible disk connections 76, 78 and sleeve connections 79, 77, 80, will move the driving rod 75 to the right. Since the piston 25 moves the outer cylinder 93 and all parts carried therein along with it, together with the supply tube 40, the valve 60 will move correctly relative to its ports to control the piston movement properly in response to the upward movement of the pilot pump piston 133 as raised by a lobe of the cam 151.

When the pilot pump piston 133 is moved down, as a depression in the pilot cam 151 allows the springs 148 to force the rod 139 downward, the piston 133 will force fluid through line 125 into the valve operating cylinder 102 to the left of the valve operating piston 110 therein and force the piston 110 and the valve 60 to the right, fluid flowing out of the right end of cylinder 102 back to the upper end of the pilot pump cylinder 130 through line 126 as fluid flows into the left end of cylinder 102. When valve 60 moves to the right it will admit power pressure fluid from supply tube 40 to the right end of cylinder 11a and move the piston 25 to the left. This will move the driving rod 75 to the left.

The reciprocatory action continues normally in response to the control action of the pilot pump piston 133, the pulsating movement of the test part continuing in response to the action of the pilot pump cam 151. There will be some changes in resistance to movement of the test part during each stroke and, because of the resilient connection, there will be some effect through the feedback piston 100 on the phase of action but this will be constant for given conditions and since it has been taken into account in the design of the operating cam it need not be considered here.

Suppose now that the test part, due to some other effects on it, interposes less resistance on the driving rod 75 so that the cylinder 102 carried thereby moves to the right in its cylinder 93. This will force fluid to flow from the right end of cylinder 93 into the right end of cylinder 102; and also allow fluid to flow from the left end of cylinder 102 into the left end of cylinder 93. The flow of fluid into the right end of cylinder 102 and out of its left end will move the valve piston 110 slightly to the left relative to its cylinder 102 and move valve 60 slightly to the left to cause power piston 25 to move slightly to the right to follow the direction of movement permitted by the test piece and apply more force on the test piece. However, since the ports 114 into cylinder 102 remain unchanged in size, the fluid pulsations from the pump and the action of the valve piston 110 remain unchanged in amplitude, only the zone of action of piston 25 being shifted to the right. The cycle of action continues but with the power piston action moved somewhat to the right, as stated, to follow up the test piece. In the heavy-action equipment illustrated it will be realized that the actual shift in distance is relatively quite small, almost incremental; but the response is prompt and quite accurate. If the test piece begins to interpose greater resistance the shift in position will be in the opposite direction, to the left; and in all cases there is a compensation in the direction of keeping the applied loads constant in the line of this loading even if other loadings cause the test piece to shift position relative to the line of loading here being considered.

It will be understood that the showing of a cam driven pump to provide signal impulses is merely illustrative and that the impulses could be provided by a longitudinal cam or that a record tape with suitable interposed mechanism might be used.

If desired, deformation measuring transducers may be added on the resilient disks to measure their relative movements and thus to indicate the applied static and dynamic forces applied by the device.

While one embodiment of the invention has been described for purposes of illustration it will be understood that there may be various embodiments and modifications within the scope of the invention.

What is claimed is:

1. A programmed vibratory force producing apparatus, comprising in combination, a fluid actuated reciprocatory force producing device, a control valve for pressure fluid supplied to said device, cyclic signal programmed means acting independently of said force producing device for operating and timing the movement of said control valve, a power connection for said force producing device to operate upon a specimen, resilient means between said force producing device and said power connection, and means conjointly responsive to said force producing device and said power connection for altering the action of said signal programmed means on said valve.

2. A programmed vibratory force producing apparatus, comprising in combination, a power actuated reciprocatory force producing device, a power control for regulating the power supplied to said device, cyclic signal programmed means acting independently of said force producing device for controlling the action of said power control and through it controlling the power supplied to said device, a power connection for said force producing device to operate upon a specimen, resilient means between said force producing device and said power connection, and means conjointly responsive to said force producing device and said power connection for altering the action of said signal programmed means on said power control.

3. A programmed vibratory force producing apparatus, comprising in combination, a power actuated reciprocatory force producing device, a power control for regulating the power supplied to said device, cyclic signal programmed means acting independently of said force producing device for controlling the action of said power control and through it controlling the power supplied to said device, a power connection for said force producing device to operate upon a specimen, resilient means between said force producing device and said power connection, and means conjointly responsive to said force producing device and said power connection for altering the action of said signal programmed means on said power control, said signal programmed means including ancillary means for controlling the amplitude of action of said power control and, through it, of said reciprocatory force producing device.

4. A programmed vibratory force producing apparatus, comprising in combination, a pressure fluid actuated reciprocatory force producing device, a control valve for pressure fluid supplied to said device, a power connection for said force producing device to operate upon a specimen, resilient means between said force producing device and said power connection, signal programmed means for operating said control valve, said valve operating means including a fluid operated power unit and a pump for supplying power fluid to said unit to reciprocate the control valve, and a supplemental fluid controlling device which is jointly responsive to said force producing device and said power connection for altering the fluid supply from said pump to said fluid operated power unit.

5. Apparatus as set forth in claim 4, further characterized by the fact that said valve operating means includes a piston operating in a slidable cylinder and that said slidable cylinder carries a differential piston operating in an outer differential cylinder, said differential piston and cylinder being acted upon between said force producing device and said power connection.

6. Apparatus as set forth in claim 4, further characterized by the fact that said valve operating means includes a rotary valve operating cam carried eccentrically on a turnable cylinder block and the pump having a piston rod having a cam follower mounted on a shaft slidably carried on guide rods on said cylinder block, the median axis of said follower shaft coinciding with the axis of turning of said cylinder block, springs urging said follower shaft along said guide rods towards said cam, and means for turning said cylinder block between positions in which said cam follower is above said cam shaft axis of alongside the cam shaft axis.

7. A programmed vibratory force producing apparatus, comprising in combination, a power cylinder, a power piston reciprocably mounted in said cylinder, a double-ended tubular piston rod carrying said piston, said tubular piston rod having axially inlet and outlet fluid ports on either side of said piston, a power fluid supply tube disposed within said piston rod and mounted to move therewith, said fluid supply tube having inlet ports disposed axially between the ports in said piston rod, a tubular valve mounted for sliding movement between said piston rod and said fluid supply tube and having fluid controlling elements for coacting with the ports of said piston rod and supply tube, means connecting the space in said piston rod beyond said valve to exhaust, and signal programmed means for reciprocating said reciprocable tubular valve, said valve reciprocating means including a valve piston connected by a rod with said valve and disposed concentrically to the axis of said piston rod, a valve cylinder for said valve piston carried by a member actuated by the power piston, resilient means forming a connection between said piston rod and said actuated member, a differential piston carried on said valve cylinder, and a differential cylinder for said differential piston carried by said power piston rod.

8. Apparatus as set forth in claim 7, wherein the space within said differential cylinder and the space within said valve cylinder freely connect by ports at opposite ends of the pistons therein, and further including a pulsating signal fluid pump for supplying fluid alternately to opposite sides of the valve piston and differential piston.

References Cited in the file of this patent
UNITED STATES PATENTS

| | | |
|---|---|---|
| 1,732,813 | Kasley | Oct. 22, 1929 |
| 2,449,639 | Cannon | Sept. 21, 1948 |
| 2,470,566 | MacConnel | May 17, 1949 |
| 2,491,551 | Cross | Dec. 20, 1949 |
| 2,580,686 | May | Jan. 1, 1952 |
| 2,652,811 | Beche | Sept. 22, 1953 |